United States Patent
Shemula

(10) Patent No.: US 7,716,143 B2
(45) Date of Patent: May 11, 2010

(54) OFFERING SEWING PATTERNS OVER A PUBLIC NETWORK

(76) Inventor: David Shemula, 4456 Haskell Ave., Encino, CA (US) 91436

( * ) Notice: Subject to any disclaimer, the term of this patent is extended or adjusted under 35 U.S.C. 154(b) by 1109 days.

(21) Appl. No.: 11/339,057

(22) Filed: Jan. 25, 2006

(65) Prior Publication Data

US 2007/0174132 A1 Jul. 26, 2007

(51) Int. Cl.
*G06Q 90/00* (2006.01)
(52) U.S. Cl. .................................. 705/500
(58) Field of Classification Search ............ 112/470.01; 705/500
See application file for complete search history.

(56) References Cited

U.S. PATENT DOCUMENTS

| | | | | |
|---|---|---|---|---|
| 4,073,299 | A * | 2/1978 | Murata | 450/1 |
| 6,564,118 | B1 * | 5/2003 | Swab | 700/131 |
| 6,600,966 | B1 * | 7/2003 | Bailie | 700/138 |
| 6,859,679 | B1 * | 2/2005 | Smith et al. | 700/138 |
| 6,983,193 | B2 * | 1/2006 | Mizuno et al. | 700/138 |
| 7,493,499 | B1 * | 2/2009 | Deaver et al. | 713/193 |
| 2002/0014191 | A1 * | 2/2002 | Shimizu | 112/475.19 |
| 2003/0205013 | A1 * | 11/2003 | Garcia | 52/316 |
| 2004/0133296 | A1 * | 7/2004 | Tomita | 700/138 |
| 2009/0025868 | A1 * | 1/2009 | Shepard et al. | 156/245 |

OTHER PUBLICATIONS

Anon., "Insight Development Expands Graphics Capacity of HP Printers," News Release, Feb. 14, 1990.*
Murie, M.D., "Poster Works Gives Users the Big Picture," MacWEEK, vol. 4, No. 33, p. 66, Oct. 1990.*
Microsoft Press Computer Dictionary, Third Edition, Microsoft Press, Redmond, 1997, pp. 150-151.*
Tribute, "ITD Sees Breakthrough in Color Copier Market," Seybold Report on Publishing Systems, vol. 27, No. 22, p. 27, Aug. 31, 1998.*
McClelland, D., "Outwit Printing Problems," MacWorld, vol. 20, No. 1, pp. 82-83, Jan. 2003.*
Anon., "Printing Trends Change," Infotech Weekly, $2^{nd}$ edition, p. 24, Oct. 18, 1999.*

* cited by examiner

*Primary Examiner*—Nicholas D Rosen

(57) ABSTRACT

The invention is directed at systems and methods for offering sewing patterns over a public network. Briefly stated, sewing patterns are delivered as tiled patterns over the public network and printed at a local computing device for assembly by a customer.

12 Claims, 6 Drawing Sheets

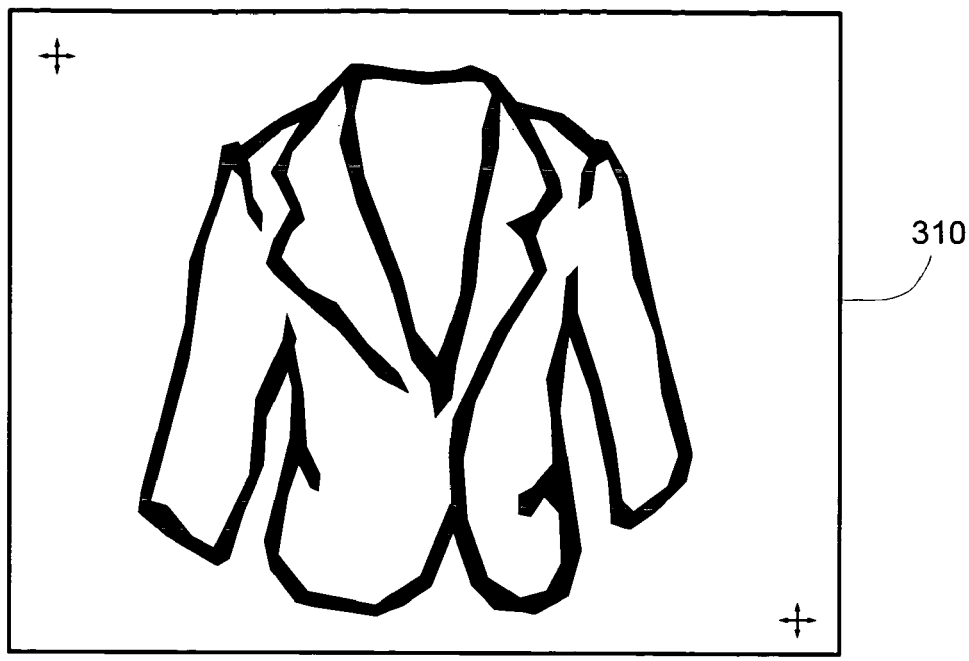
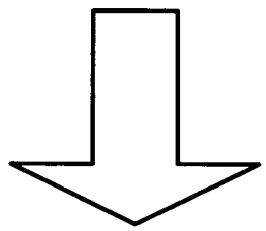
Fig.3
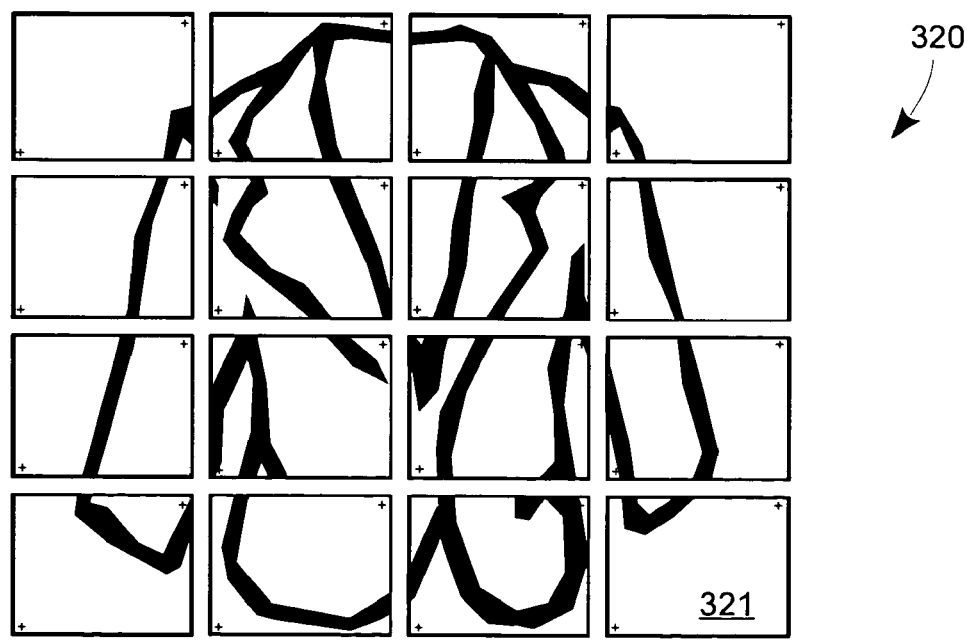

OFFERING SEWING PATTERNS OVER A PUBLIC NETWORK

The invention is in the area of telecommunications. More specifically, the invention is directed at the area of electronic commerce.

BACKGROUND

Sewing is a favorite pastime of many people. It is enjoyable and can be a cost effective way to make clothing or other sewn items. Traditionally, someone interested in sewing their own item would purchase a sewing pattern, take it home and cut it out, attach it to some material, and cut the material along lines on the pattern. The person could then sew together the cut pieces to make the garment.

One problem is that the size of these patterns makes their distribution somewhat difficult. More specifically, because these patterns must be actual size, they are typically only distributed in envelopes on large sheets of crepe paper. An adequate alternative to these traditional distribution mechanisms has eluded those skilled in the art, until now.

BRIEF DESCRIPTION

FIG. 3 is a conceptual illustration of a full-sized sewing pattern that is transformed into a tiled pattern.

SUMMARY

The present invention is directed at systems and methods for offering sewing patterns over a public network. Briefly stated, sewing patterns are delivered as tiled patterns over the public network and printed at a local computing device for assembly by a customer.

In one aspect, the invention envisions transforming a full-sized sewing pattern into a tiled sewing pattern, the tiled-sewing pattern including a plurality of tiles with each tile being sized in accordance with a standard paper size, each tile including alignment marks for use in assembling the plurality of tiles; and providing access to the tiled sewing pattern by a remote computing device over a public network, the access including an ability to print the plurality of tiles on a printer coupled to the remote computing device.

This Summary is provided to introduce a selection of concepts in a simplified form that are further described below. This Summary is not intended to identify key or essential features of the claimed subject matter, nor is it intended to limit the scope of the claimed subject matter.

DETAILED DESCRIPTION

Figure 1:
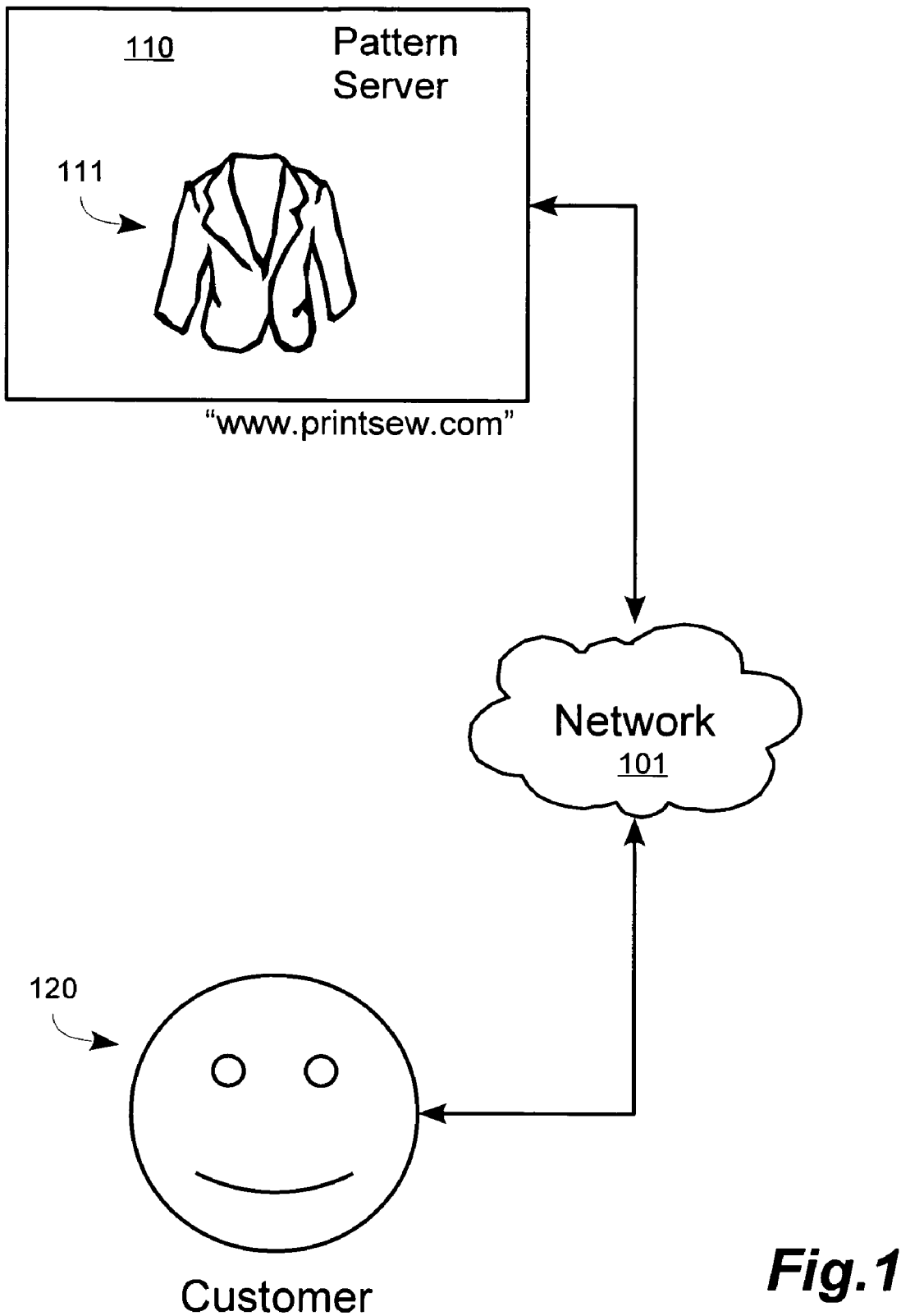
FIG. 1 is a conceptual overview of a system for delivering sewing patterns over a public network.

FIG. 1 is a conceptual overview of a system 100 for delivering sewing patterns over a public network. In this illustrative system, a pattern server 110 and a customer computer 120 are in communication over a public network 101, such as the Internet. The system 100 enables those consumers that have access to the public network 101 to easily access sewing patterns that are made available by the pattern server 110.

Generally stated, the customer 120 can be, for the purpose of this discussion, any computing device capable of network communications over the public network 101. Ideally, but not necessarily, the customer 120 includes browsing software compatible with industry standard communications protocols, such as TCP/IP and HTTP. In addition, ideally but not necessarily, the customer 120 includes a printing system, which may include both hardware (e.g., a printer) and software (e.g., print drivers and controls).

The pattern server 110 can be any general or special purpose computing device that is also coupled to remote computing systems over the public network 101. On the pattern server 110 resides one or more tiled sewing patterns 111 that are made accessible by the pattern server 110. The tiled sewing patterns 111 are described in greater detail below. But generally stated, the tiled sewing patterns 111 are a set of tiles that can be printed on standard-sized paper and assembled to form a sewing pattern that is larger than the individual tiles.

In illustrative operation, the customer 120 navigates to a location on the public network 101 associated with the pattern server 110. The customer 120 is presented with a variety of sewing patterns from which to select a desired pattern. In response to this selection, the pattern server makes the desired pattern available for printing by the customer.

Ideally but not necessarily, the pattern server 110 makes the desired pattern available for printing by the customer without allowing the desired pattern to be stored persistently on the customer computing system 120. This feature can help to avoid pattern sharing without payment, which might otherwise be a problem for making sewing patterns available in digital format.

Using this system, the customer 120 is able to conveniently browse patterns, select a desired pattern, and print that desired pattern locally. Then, with some simple assembly, the customer has a sewing pattern that can be used to sew a design.

Figure 2:
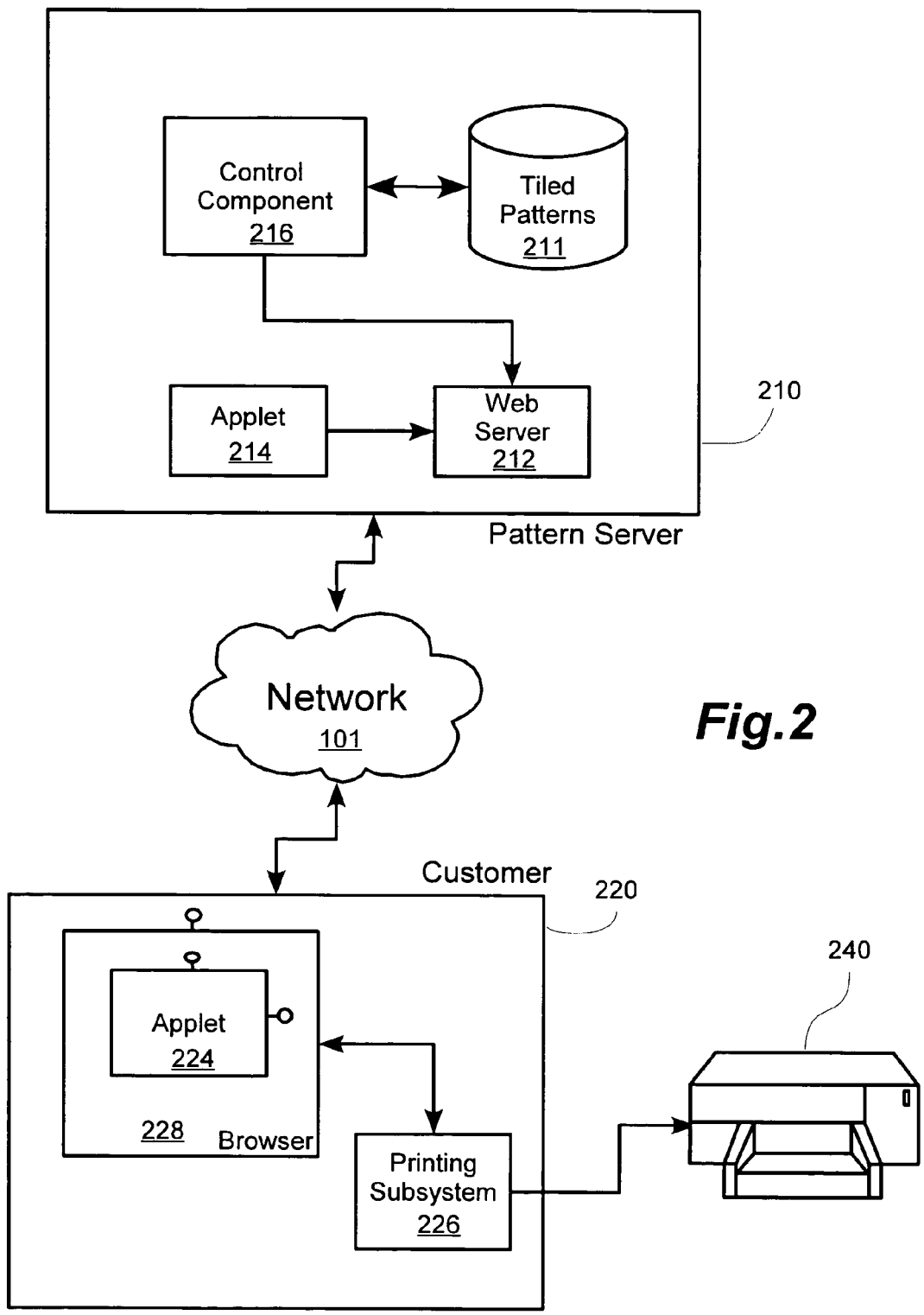
FIG. 2 is a functional block diagram illustrating in greater detail a system for delivering sewing patterns over a public network.

FIG. 2 is a functional block diagram illustrating in greater detail a system for delivering sewing patterns over a public network. In this implementation, a pattern server 210 is coupled to a public network 101, such as the Internet, and offers sewing patterns online. The pattern server may be any general or special purpose computing system programmed in accordance with the functional components described here.

The pattern server 210 includes web server software 212 to enable communications between the pattern server 210 and remote computers over the public network 101. The web server component 212 may be configured to communicate, for example, using any one or more of several acceptable communications protocols and standards, such as HTTP, TCP/IP, SIP, SMTP, POP3, UDP, MMS, SMS, RTSP, or the like.

The pattern server 210 also includes persistent storage (e.g., a hard drive or optical storage) on which tiled patterns 211 are stored. An 'applet' 214 is included in the pattern server 210 and is configured for download by a remote computing system, such as the customer computing system 220, over the public network 101. The applet 214 may be software code or a component, such as an Active X control or Java applet, that is configured to handle printing a tiled pattern 211 on a remote computing system in a secure fashion.

A control component 216 resides and executes on the pattern server 210 and manages the several functions of the system. The control component 216 is in operative communication with the web server component 212, the server storage, and the applet 214. The control component 216 is configured to accept incoming communications via the web server 212, to present a list of the tiled patterns 220 for browsing, and to make the applet 214 available for download should the customer 220 desire to print a pattern. If a remote computing system downloads an instance of the applet 214, the control component 216 is operative to communicate with the remote instance of the applet (e.g., applet 224) to deliver a tiled pattern for printing by the remote instance of the applet 224.

The customer 220 is any general or special purpose computing system capable of communicating with other computers over the public network 101. A printer 240 is in operative communication with the customer 220, either directly connected to the customer 220 (e.g., a USB or IEEE 1284 connection) or indirectly connected to the computer (e.g., a LAN connection). The printer 240 is configured to print on paper of any one or more standard sizes, such as letter, legal, 11"×17", A4, or the like. The customer 220 includes a printing subsystem 226 which enables applications executing on the customer 220 to print to the printer 240.

The customer 220 also includes browsing software 228 to enable communications with remote computers, such as the pattern server 210, over the public network 101. Generally stated, the browsing software 228 is configured to operate in accordance with any one or more communications protocols, such as HTTP, TCP/IP, SIP, SMTP, POP3, UDP, SMB, MMS, SMS, RTSP, or the like. In this implementation, the browser 228 is configured to retrieve code, such as Active X controls or Java applets, from remote locations and execute the code in a secure execution environment—sometimes referred to as a 'sandbox.'

In this particular implementation, the browser 228 enables a user to navigate to a location on the public network 101 and browse information served by servers on the network. In one example, the customer 220 can browse to the pattern server 210 and browse the several tiled patterns 211 resident there. If the user of the customer 220 discovers a pattern that is to her liking, the customer 220 can download and execute the applet 224 within the browsing environment 228. The pattern server 210 can transmit the desired tiled pattern from the control component 216 to the locally-executing copy of the applet 224 within the browser 228. Then, using the printing subsystem 226, the applet 224 can cause the desired tiled pattern to be printed on the printer 240.

In this manner, the customer 220 is capable of browsing the several tiled patterns 211, retrieving a desired tiled pattern, and printing the desired tiled pattern on multiple sheets of paper on the printer 240. In addition, the use of the applet 224 prevents the persistent storage of the tiled pattern locally, which helps avoid any temptation to violate copyrights in the pattern.

Although described here in terms of a system that employs anti-piracy mechanisms, it should be appreciated that the invention has equal applicability in an environment where the actual tiled pattern is capable of download to the customer 220 without employing the applet 224. In such a system, any other applicable image printing program could be used to print the tiled pattern, and the tile pattern could, potentially, be stored persistently by the customer 220.

FIG. 3 is a conceptual illustration of a full-sized sewing pattern 310 that is transformed into a tiled pattern 320. In this illustration, a full-sized sewing pattern 310 exists on a large single sheet of conventional pattern paper. A jacket is illustrated on the full-sized sewing pattern 310 in simplified fashion. It will be appreciated that in reality a single item of clothing may require several different sheets of pattern paper, most of which are sized larger than a standard sheet of paper. However, to avoid obfuscation, this discussion will merely present the principles of the invention in terms of a single large sewing pattern. Those skilled in the art will easily apply these principles to more complex sewing patterns.

In accordance with the invention, the full-sized sewing pattern 310 is transformed into the tiled pattern 320 by figuratively 'cutting' the full-sized pattern into smaller pieces with each piece being called a tile (e.g. tile 321). Each tile is sized for printing on a standard sized piece of paper, such as letter or A4 sized paper. In this way, the several tiles can be printed and assembled to recreate the full-sized pattern 310.

Certain techniques can be employed to assist with and simplify the reassembly of the several tiles. In one example, each tile may be marked with a row and column number identifying its position in the reassembled whole. For instance, the top left tile could be printed with the notation (A,1) to indicate its position in the first row and first column of the reassembled whole. In an enhancement, one tile can be provided that is a small graphical representation of the reassembled pattern which the user can use as a guide during reassembly, much the way a picture is used while putting together a puzzle.

Alignment indicia can also be printed on each tile to simplify the task of aligning the several tiles during reassembly. In a simple form, ordinary marks (e.g., hash marks or crosses) can be positioned on each tile. During assembly, the marks are aligned for each adjoining tile. Although this is an acceptable method, a superior technique is illustrated in FIGS. 5 and 6, and described below.

Figure 4:
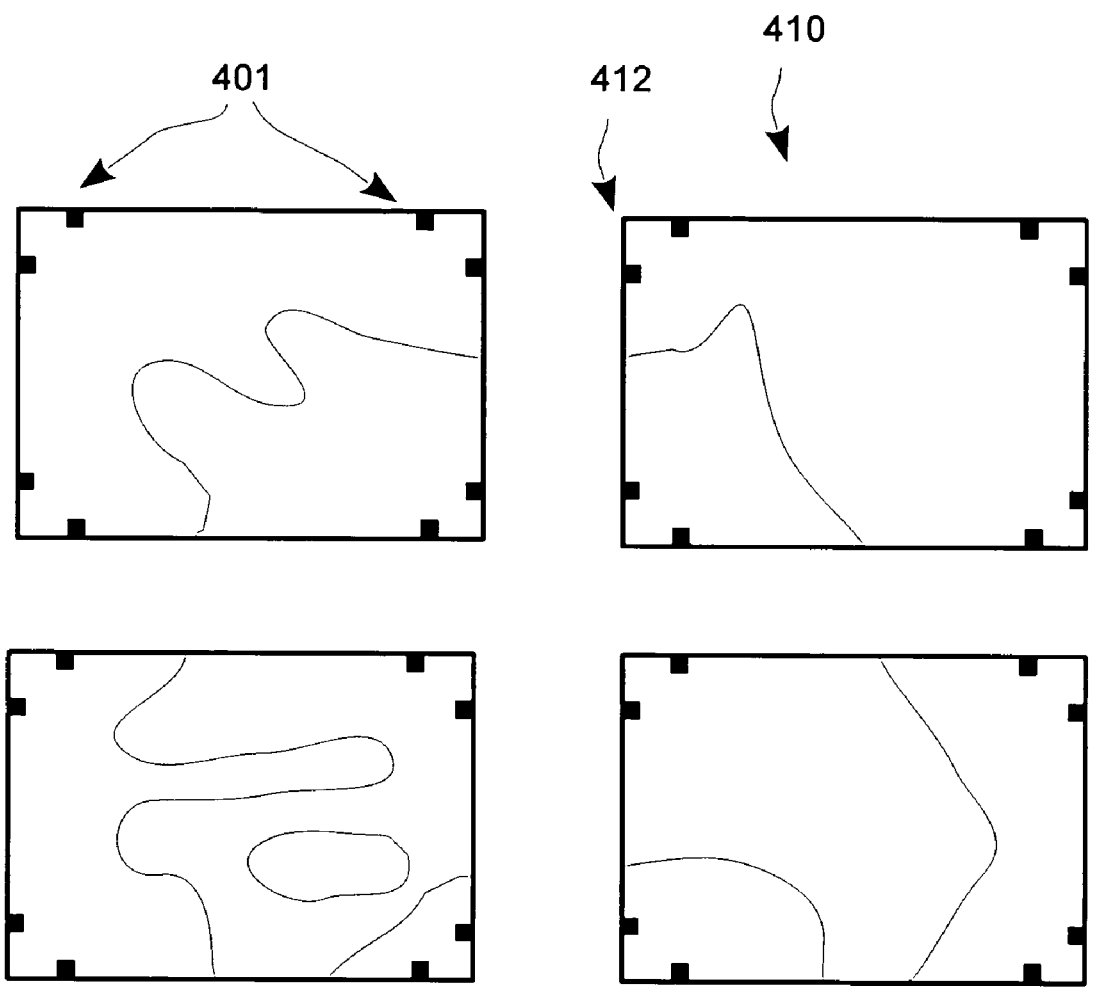
FIG. 4 is a graphical representation of a technique for aligning several tiles to form a reassembled full-sized pattern.

FIG. 4 is a graphical representation of a technique for aligning several tiles to form a reassembled full-sized pattern. In this implementation, small colored marks (e.g., black squares 401) are positioned along the sides of each tile proximate to each corner of the tile. More specifically, each corner of a tile, such as tile 410, has two alignment marks with one alignment mark being positioned on each side of the corner 412.

In one specific implementation, each alignment mark 401 is a colored (e.g., black) square or other regular shape. Each mark is positioned approximately between one quarter of an inch and two inches from the corner 412 along the edge of the tile 410.

Figure 5:
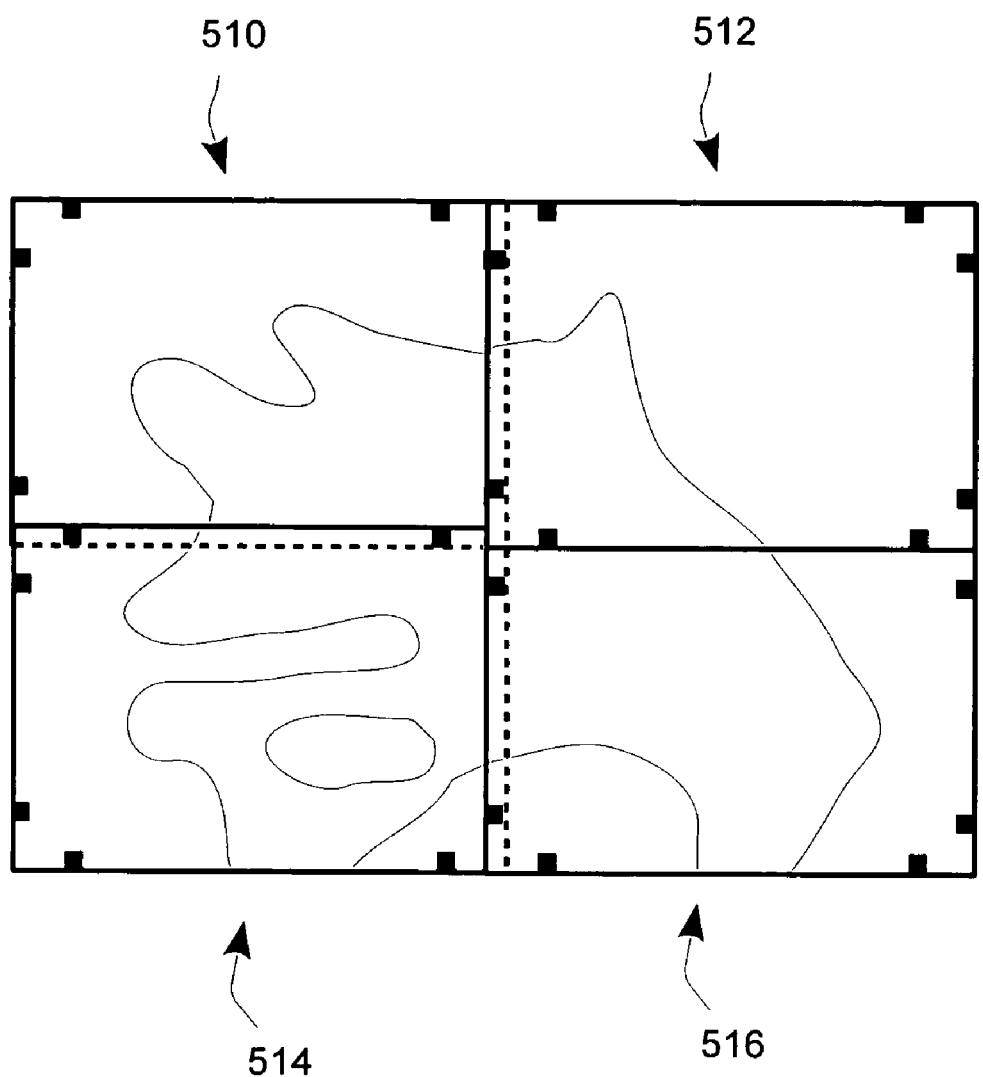
FIG. 5 is a graphical representation of the alignment of a number of tiles configured with alignment marks as illustrated in FIG. 4.
Figure 6:
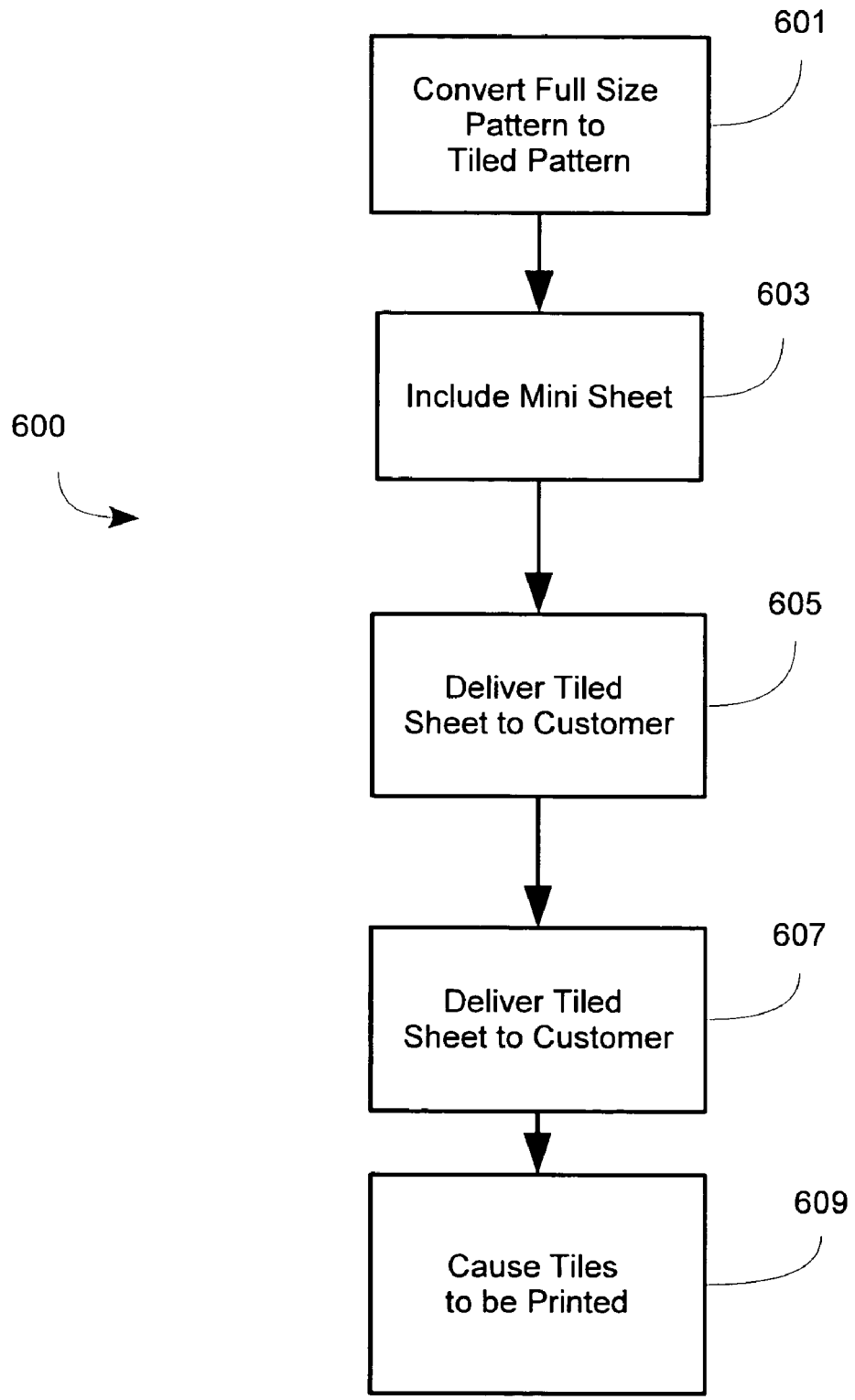
FIG. 6 is an operational flow diagram generally illustrating a process for making sewing patterns available for online distribution, in accordance with one embodiment of the present invention.

FIG. 5 is a graphical representation of the alignment of a number of tiles configured with alignment marks as illustrated in FIG. 4. Shown are a portion of four tiles (tile A 510, tile B 512, tile C 514, and tile D 516) that are being assembled in accordance with the preceding disclosure.

Alignment is accomplished by overlapping a portion of tile A 510 on top of tile B 512 such that the two alignment marks on one side, the vertical side in this example, are exactly aligned. The color of the alignment marks should be sufficiently contrasting with the color of the paper, and the opacity of the paper should be appropriately selected so that the alignment marks are at least partially visible through the paper. Those two tiles can then be temporarily attached, perhaps using a small piece of tape or the like.

Next, tile C 514 is placed under or over tile A 510 along the horizontal edge such that the alignment marks at both corners of tiles A 510 and C 514 are aligned. Those two tiles are then temporarily affixed. Finally tile D 516 is placed under or over the existing arrangement (i.e., tiles A, B, and C) such that the alignment marks on the horizontal edge of tile D 516 align with the alignment marks on the horizontal edge of tile B 512, and the alignment marks on the vertical edge of tile D 516 align with the alignment marks on the vertical edge of tile C 514. The four tiles can then be permanently affixed to each other.

This process is repeated for every tile in the set of tiles that make up the tiled pattern. The inventors have discovered, through experimentation and otherwise, that the use of alignment marks as described here achieves a greater degree of accuracy and superior finished product over simply using a single alignment mark centrally located in each corner of a tile. however, the choice of which type of alignment mark is merely a design consideration and many various types of alignment marks can be used without departing from the spirit and scope of the present invention.

FIG. 6 is an operational flow diagram generally illustrating a process for making sewing patterns available for online distribution, in accordance with one embodiment of the present invention. The process 600 begins at step 601, where an enterprise, such as a sewing pattern distributor, desires to distribute sewing patters online.

At step 601, a full-sized sewing pattern is transformed into a tiled sewing pattern. The tiled sewing pattern is made up of a plurality of tiles with each tile being sized in accordance with a standard paper size, and each tile includes alignment marks for use in assembling the plurality of tiles.

At step 603, a "mini sheet" or small representation of the full-sized sewing pattern is included with the plurality of tiles. This step is purely optional, but may be helpful when the other tiles are assembled.

At step 605, an applet is delivered to a customer over a public network, such as the Internet. This may be accomplished when the customer accesses a web site or other electronic location maintained by the sewing pattern distributor. The applet may be software code that is executable on a remote computing device.

At step 607, the tiled sewing pattern is delivered to the customer. More specifically, each tile of the tiled sewing pattern is delivered, perhaps synchronously or perhaps asynchronously, to the remote computing device on which executes the applet.

At step 609, the tiled sewing pattern is caused to be printed by the remote computing device. In one specific implementation, the applet that was downloaded to the remote computing device communicates with resources coupled to the remote computing device, such as a printer. The applet causes the tiles of the tiled sewing pattern to be printed without persistently storing the tiled sewing pattern on the remote computing device.

Process 600 has been illustrated and described sequentially in a particular order. However, in other embodiments the operations described in the blocks may be performed in different orders, multiple times, and/or in parallel. Further, in some embodiments, one or more operations described in the blocks may be separated into another block, omitted or combined.

Although the invention has been described in language specific to particular embodiments or implementations, it should be understood that the subject matter defined by the following claims is not necessarily limited to the specific embodiments or implementations described above. Rather, the specific embodiments described above are provided merely as non-exhaustive examples of implementing the subject matter claimed below.

The invention claimed is:

1. A computer-implemented method for delivering sewing patterns, comprising:
    transforming a full-sized sewing pattern into a tiled sewing pattern, the tiled sewing pattern comprising a plurality of tiles with each tile being sized in accordance with a standard paper size, each tile including alignment marks for use in assembling the plurality of tiles; and
    providing access to the tiled sewing pattern by a remote computing device over a public network, the access including an ability to print the plurality of tiles on a printer coupled to the remote computing device.

2. The computer-implemented method recited in claim 1, wherein each tile comprises a corner and wherein the alignment marks are located on either side of the corner.

3. The computer-implemented method recited in claim 2, wherein the alignment marks comprise colored squares.

4. The computer-implemented method recited in claim 1 wherein providing access to the tiled sewing pattern comprises enabling browsing of a plurality of tiled sewing patterns and delivering an applet that implements the ability to print the plurality of tiles.

5. The method recited in claim 4 wherein the applet disallows persistent storage of the tiled sewing pattern on local storage.

6. A computer-readable medium encoded with computer-executable components for delivering sewing patterns, the components comprising:
    at least one tiled pattern including a plurality of tiles, wherein the at least one tiled pattern is transformed from at least one full-sized sewing pattern, each tile being sized in accordance with a standard paper size, each tile including alignment marks for use in assembling the plurality of tiles;
    a downloadable applet configured to enable printing the plurality of tiles on a remote computing system if the downloadable applet is downloaded to the remote computing system; and
    a control component configured to facilitate delivery of the downloadable applet to the remote computing system over a public network and to facilitate delivery of the plurality of tiles to the downloadable applet on the remote computing system.

7. The computer-readable medium recited in claim 6, wherein the standard paper size comprises a selected one from a group comprising letter size, legal size, and A4 size paper.

8. The computer-readable medium recited in claim 6, wherein each tile comprises a corner and wherein the alignment marks are located on either side of the corner.

9. The computer-readable medium recited in claim 8, wherein the alignment marks comprise colored squares.

10. The computer-readable medium recited in claim 6, wherein the downloadable applet comprises code executable in a browsing environment that resides on the remote computing system.

11. The computer-readable medium recited in claim 6, wherein the downloadable applet is further configured to disallow persistent storage of the tiled pattern on the remote computing system.

12. The computer-readable medium recited in claim 11, wherein the downloadable applet comprises an Active X control or a Java applet.

* * * * *